(12) United States Patent
Kawasaki et al.

(10) Patent No.: US 7,086,492 B2
(45) Date of Patent: Aug. 8, 2006

(54) FUEL CELL VEHICLE

(75) Inventors: Satoshi Kawasaki, Saitama (JP); Tohru Ono, Saitama (JP); Yukio Hiruta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 334 days.

(21) Appl. No.: 10/646,236

(22) Filed: Aug. 22, 2003

(65) Prior Publication Data

US 2004/0035632 A1    Feb. 26, 2004

(30) Foreign Application Priority Data

Aug. 23, 2002   (JP)   .............................. 2002-243683

(51) Int. Cl.
*B60K 28/10*   (2006.01)

(52) U.S. Cl. ...................... 180/274; 307/10.7; 180/68.5

(58) Field of Classification Search ............... 180/68.5, 180/279, 284, 282, 283, 271, 274, 277; 307/10.7
See application file for complete search history.

(56) References Cited

U.S. PATENT DOCUMENTS

| | | | | |
|---|---|---|---|---|
| 3,794,136 A | * | 2/1974 | Okada | ........................ 180/274 |
| 5,281,780 A | * | 1/1994 | Haland | ...................... 200/52 R |
| 5,483,447 A | * | 1/1996 | Jeenicke et al. | ............... 701/45 |
| 5,484,166 A | * | 1/1996 | Mazur et al. | ................ 280/735 |
| 5,641,031 A | * | 6/1997 | Riemer et al. | ............. 180/65.3 |
| 5,793,005 A | * | 8/1998 | Kato | .................... 200/61.45 R |
| 5,934,703 A | * | 8/1999 | Mimura et al. | ............. 280/734 |
| 6,167,335 A | * | 12/2000 | Ide et al. | ........................ 701/45 |
| 6,644,688 B1 | * | 11/2003 | Hu et al. | ...................... 280/735 |

FOREIGN PATENT DOCUMENTS

JP   2001-119815   4/2001

* cited by examiner

*Primary Examiner*—Paul N. Dickson
*Assistant Examiner*—Tiffany L. Webb
(74) *Attorney, Agent, or Firm*—Lahive & Cockfield, LLP; Anthony A. Laurentano, Esq.

(57) ABSTRACT

A fuel cell vehicle driven by generated electric power of a fuel cell comprises a fuel cell box disposed underneath a floor for storing therein the fuel call, G sensors for detecting a deformation of a vehicle body sideward of the fuel cell box, and a shut-off valve for closing a supply side piping of a hydrogen gas supplied to the fuel cell when a predetermined amount of deformation or the vehicle body is detected by the G sensors.

4 Claims, 2 Drawing Sheets

100 # FUEL CELL VEHICLE

BACKGROUND OF THE INVENTION

1. Field of the Invention

The present invention relates to a fuel cell vehicle. More particularly, the present invention relates to a fuel cell vehicle in which a fuel cell can be protected from the intrusion of a member of a vehicle body in the event that a side of the vehicle body is deformed.

2. Description of the Related Art

Among automobiles, fuel cell Vehicles are known in which electricity is generated by supplying hydrogen, which is a fuel gas, and oxygen, which is an oxidant gas, and in which generated electric power resulting from the electricity generation are used to drive a motor, which, in turn, drives the fuel cell vehicle.

As such a fuel cell, there exists, for example, a fuel cell (a proton-exchange membrane fuel cell) constituted by stacking a number of fuel cells in each of which a membrane electrode assembly in which a solid polymer electrolyte membrane is held between an anode-side electrode and a cathode-side electrode is held, in turn, by a pair of separators.

Incidentally, among such fuel cell vehicles, for example, as is disclosed in JP-A-2001-119815, there is known a fuel cell vehicle in which an impact detecting sensor such as a G sensor for detecting an impact is provided on a fuel cell itself. In this fuel cell vehicle, the supply of hydrogen is stopped when an Impact is applied to the fuel cell in the event that the fuel cell vehicle is involved in a collision.

The fuel cell vehicle that has been described above is superior in that the safety of the fuel cell that would be endangered by the impact applied thereto can be ensured. However, in the event that the fuel cell is deformed as a result of the deformation of a member of a vehicle body caused by a collision which generates no large impact or in the event that there occurs a collision that cannot be detected by the single acceleration sensor, there is caused a problem that such a collision cannot be detected.

The fuel cell is normally stored in a fuel cell box for protection. However, attempting to increase the strength and rigidity of the fuel cell box in anticipation of the aforesaid deformation of the fuel cell or the box storing therein the fuel cell which results from the deformation of the member of the vehicle body which is accompanied by an impact which is not large causes a problem that the weight of the vehicle body is increased by the attempt to thereby oppositely deteriorate the fuel economy.

SUMMARY OF THE INVENTION

An object of the present invention is to provide a fuel cell vehicle which can enable the detection of an intrusion of a member of the vehicle body at the time of collision while preventing an increase in weight of the vehicle body.

In order to accomplish the object above, the following means are adopted. According to a first aspect of the invention, there is provided a fuel cell vehicle driven by generated electric power of a fuel cell (for example, a fuel cell 3 in an embodiment), comprising a fuel cell box disposed under a floor of the fuel cell vehicle (for example, a fuel cell box 4 in the embodiment) for storing the fuel cell, a deformation detecting sensor (for example, G sensors 6 in the embodiment) for detecting a deformation of a vehicle body sideward of the fuel cell box, and a protection device (for example, a shut-off valve 15 in the embodiment) for implementing a predetermined protecting operation of the fuel cell when the deformation detecting sensor detects a predetermined amount of deformation of the vehicle body.

According to the construction, in the event that even a relatively small impact that could not be detected by a single acceleration sensor is applied toward a side of the fuel cell box, if the predetermined amount of deformation of the vehicle body is detected by the deformation detecting sensor, the fuel cell is allowed to start taking a protecting action by the protecting device.

According to a second aspect of the invention, there is provided a fuel cell vehicle wherein the deformation detecting sensor comprises a plurality of acceleration sensors (for example, G sensors 5, 6 in the embodiment), and wherein the vehicle body deformation amount is obtained based on a difference in travel of a vehicle body calculated from accelerations detected by the respective acceleration sensors.

According to the construction, an intrusion amount of a member of the vehicle body into the fuel cell box can be detected from the difference in travel of the vehicle body at the locations where the respective acceleration sensors are mounted by making effective use of the existing acceleration sensors. Furthermore, as when a relatively large impact is applied, it is possible to take the predetermined protecting action by the acceleration sensors.

According to a third aspect of the invention, there is provided a fuel cell vehicle wherein the deformation detecting sensor is a stroke sensor provided at a side of the fuel cell box.

According to the construction, an intrusion amount of a member of the vehicle body into the fuel cell box can be detected directly.

DETAILED DESCRIPTION OF THE INVENTION

An embodiment of the invention will be described based on the accompanying drawings.

Figure 1:
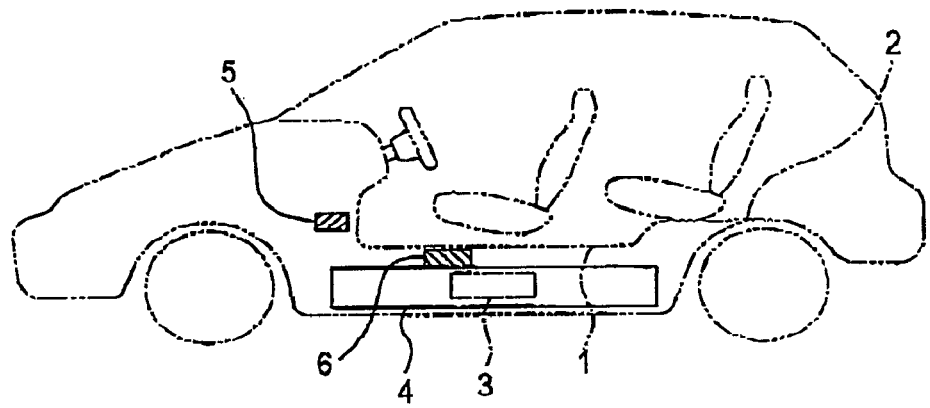
FIG. 1 is an explanatory side view of a vehicle according to an embodiment of the invention.

As shown in FIG. 1, a rear floor 2 is connected to the rear of a front floor (floor) 1 of a fuel cell vehicle in such a manner as to rise therefrom. A fuel cell box 4 covers a proton-exchange membrane fuel cell 3 and unitized peripheral equipment thereof. The fuel cell box 4 is disposed underneath the front floor 1. A G sensor (as a deformation detecting sensor or an acceleration sensor) 5 is disposed at a location above a front portion of the fuel cell box 4. G sensors (as deformation detecting sensors or acceleration sensors) 6 are disposed at locations above sides of the fuel cell box 4. Here, the G sensor 5 disposed forward of the fuel cell 3 is an existing acceleration sensor for detecting behaviors of the vehicle. The G sensors 6 disposed at the locations sideward of the fuel cell box 4 are sensors that are additionally disposed according to the invention.

Figure 2:
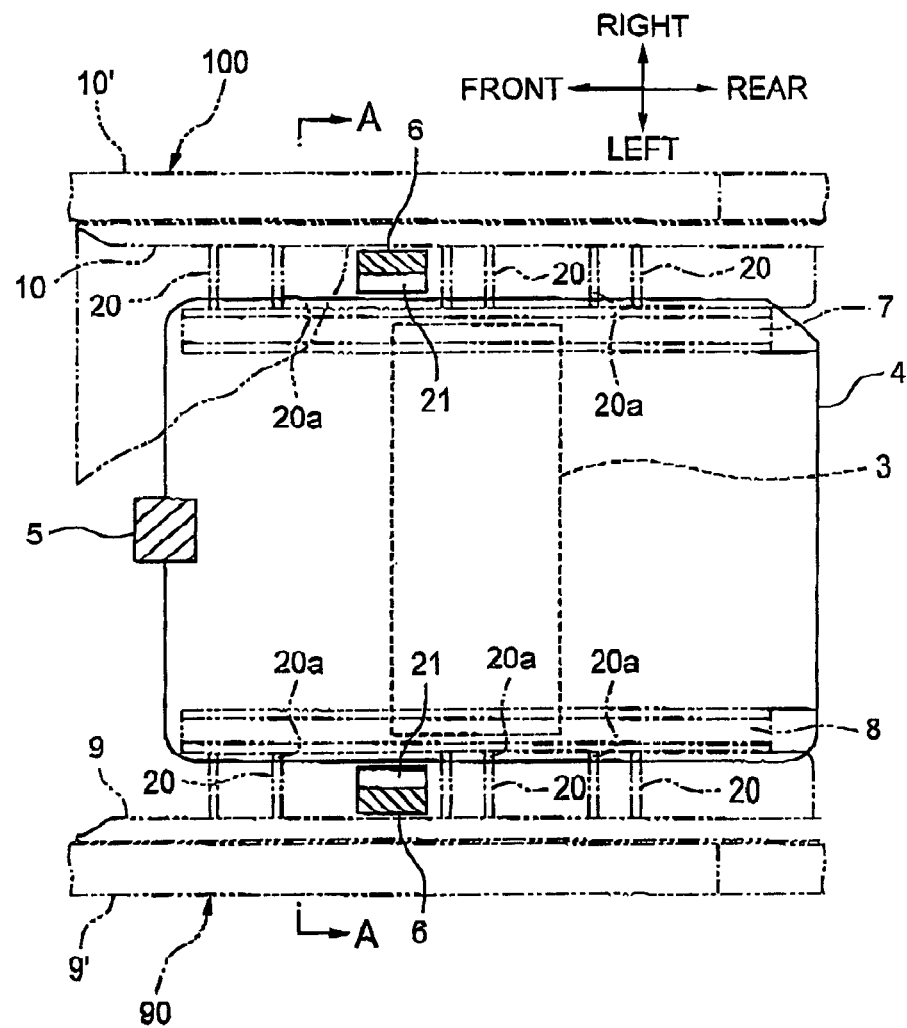
FIG. 2 is an explanatory plan view of a main part in FIG. 1.
Figure 3:
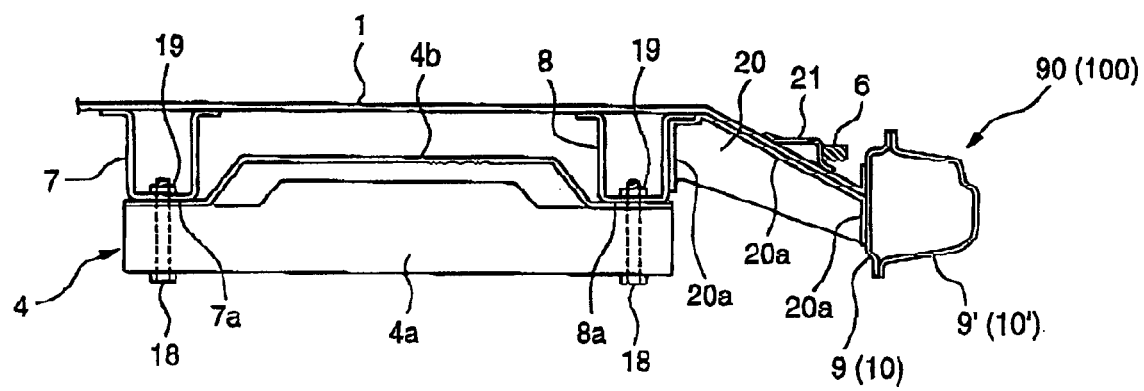
FIG. 3 is a sectional view taken along the line A—A in FIG. 2.

As shown in FIGS. 2, 3, the front floor 1 is formed such that a transversely central portion becomes flat whereas side portions gradually incline downwardly. Longitudinally running floor frames 7, 8 which constitute the framework of a vehicle body are connected to a lower side of the flat portion of the front floor 1 along left and right outer sides thereof. In addition, right and left inside sills 9, 10 (only one inside sill is shown) are connected to side edges of the front floor 1, respectively. Then, outside sills 9', 10' (only one outside sill is shown) are joined to the inside sills 9, 10, respectively, to thereby form side sills 90, 100 (only one side sill is shown) which are part of the framework of the vehicle body.

Figure 4:
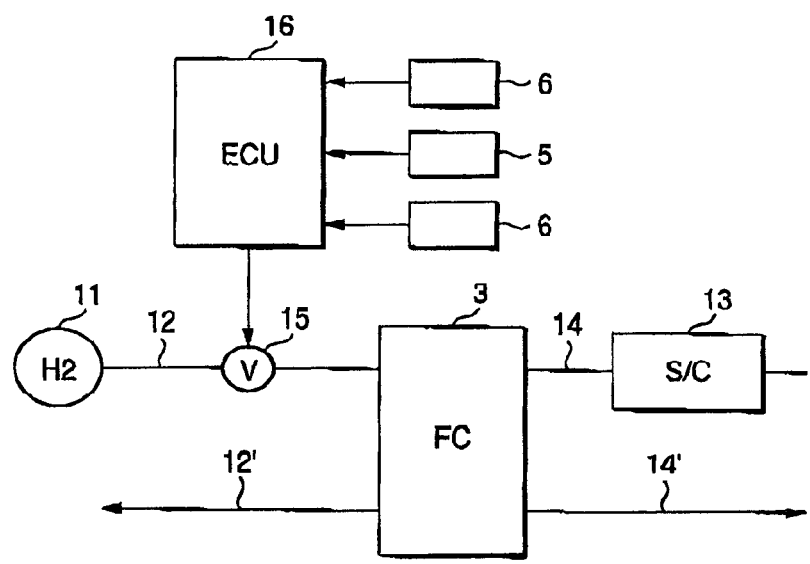
FIG. 4 is a block diagram according to the embodiment of the invention.

As shown in FIG. 4, the fuel cell 3 generates electricity through a reaction of hydrogen gas (H2) supplied from a hydrogen tank 11 via a supply side piping 12 with oxygen in the air which is supplied from a compressor 13 such as a super charger (S/C) via a supply side piping 14. Then, the fuel cell 3 supplies generated electric power to a driving motor, not shown, so as to drive the fuel cell vehicle. A shut-off valve 15 is interposed at a position along the supply side piping 12 of the hydrogen tank 11, so that hydrogen gas flowing from the hydrogen tank 11 through the supply side piping 12 can be shut off when stop of the operation of the fuel cell 3 is desired. Then, this shut-off valve 15 is connected to a controller (ECU) 16, and the G sensors 5, 6 are connected to this controller 16. Note that reference numerals 12', 14' denote hydrogen and oxygen discharge side pipings, respectively.

As shown in FIGS. 2, 3, the fuel cell box 4 is such as to include a box main body 4a which stores therein a fuel cell unit which contains fuel cells and a lid 4b provided thereon. The box main body 4a is formed so as to rise convexly on an upper side thereof, and the lid 4b is also formed so as to rise convexly in a corresponding fashion. Then, the box main body 4a and the lid 4b are fixed to each other by passing bolts 18 through bottom walls 7a, 8a of the floor frames 7, 8 from below to be screwed into nuts 19.

Here, brackets 20 are joined between the left and right floor frames 7, 8 and the left and right inside sills 9, 10 at three locations on one side and hence six locations on both sides. The bracket 20 has a flange portion 20a which is constructed to be joined to the floor frame 7, 8, the inside sill 9, 10 and the back side of the front floor 1.

Then, as shown in FIG. 1, the C sensor 5 is disposed inside a dashboard, and as shown in FIG. 3, the G sensor 6 is attached to a transversely outwardly facing side of an attachment bracket 21 having an L-shaped cross section which is attached to an inclined part on each side of the front floor 1.

According to the embodiment, when the vehicle collides sideways, the respective sensors 5, 6 detect accelerations at the moment of the collision. In the event that the accelerations so detected are larger than a predetermined value, since an impact generated by the collision is large, a countermeasures can be implemented by stopping the operation of the fuel cell 3 immediately after the collision. Even in the event that the accelerations so detected are smaller than the predetermined value, for example, in the event that the travel of a member on the side of the vehicle body is large, an approach of the member of the vehicle body toward the fuel cell 3 or the fuel cell box 4 can be detected to thereby start to take a protecting action.

In this embodiment, the two G sensors are used to constitute the deformation detecting sensors for detecting a deformation amount of the vehicle body. To be specific, a travel of the vehicle body in the vicinity of the G sensor 5 is calculated from an acceleration detected by the G sensor 5 provided substantially at the center of the vehicle using the following expression (1). Further, a travel of the vehicle body in the vicinity of the G sensor 6 is estimated from an acceleration detected by the G sensor 6 provided on the side of the vehicle using the following expression (2).

$$S = \int v(t)dt = \int (v0 - \int G(t)dt)dt \quad (1)$$

$$S' = \int v(t)dt = \int (v0 - \int G'(t)dt)dt \quad (2)$$

(where, S,S' denotes travel, v0 initial speed, and G, G' acceleration (a detected value by the sensor)).

Here, although the initial speed v0 cannot be detected by the acceleration sensors, since the value of v0 is substantially equal, a deformation amount of the vehicle body in the vicinity of the G sensor 6 can be detected by obtaining a difference (S'−S) between the estimated travels S', S.

Namely, when the accelerations detected by the respective G sensors 5, 6 are integrated by time twice to obtain travels at the locations where the G sensors are attached, for example, an inward travel of the left side sill 90 can be obtained from a difference in travels at the respective locations. Therefore, in the event that the travel so obtained equals to a distance between the side sill 90 and the side wall of the fuel cell box 4, the fuel cell 3 is shifted to take the predetermined protecting action, thereby making it possible to prevent a damage to the fuel cell 3.

To specifically describe the protecting action, a signal is sent from the controller 16 to the shut-off valve 15 to initiate a valve closing operation, whereby the shut-off valve 15 shuts off the supply side piping 12 of the hydrogen tank 11 so as to stop the supply of hydrogen to the fuel cell 3. Furthermore, the operation of the compressor 13 is stopped, whereby the operation of the fuel cell 3 is stopped.

As a result, even in the event that the member of the vehicle body such as the side sill 90 (100) is deformed to thereby deform the fuel cell box 4 when the vehicle collides sideways, the protecting action such as stopping the operation of the fuel cell 3 can be implemented by the G sensors 5, 6 before the side sill 90 (100) reaches the fuel cell box 4. Furthermore, even in the event that a collision which is so small that no large impact can be detected occurs, the fuel cell box 4 is prevented from being deformed by the deformation of the member of the vehicle body, thereby making it possible to protect the fuel cell 3. Consequently, troublesome operations can be eliminated which would otherwise have to occur frequently when all impacts including small collisions like this are made to be detected by the G sensors 5, 6 so that the operation of the fuel cell 3 is stopped every time such impacts are detected, and the fuel cell 3 can be shifted to take the predetermined protecting action in an ensured fashion. In addition, a drawback can be eliminated that the vehicle weight is increased by increasing the rigidity of the fuel cell box 4 more than required.

In addition, since only the G sensors 6 are additionally provided at the sides of the vehicle body while the existing G sensor 5 is used effectively for this purpose, the required countermeasures can be provided at low costs.

Note that the invention is not limited to the embodiment. While the invention has been described with respect to the case where the three G sensors are used, for example, stroke sensors may be used instead of to G sensors 6 provided at the sides of the vehicle body to directly measure traveling strokes (travels) of the side sills 90, 100 or inner surfaces of the inside sills 9, 10. According to this construction, travels of the members of to vehicle body can be detected wit greater accuracy. In addition, the invention can also be applied to a fuel cell vehicle which installs therein a fuel cell other than to proton-exchange membrane fuel cell provided tat the fuel cell can be equipped on board.

As has been described heretofore, according to the first aspect of the invention, in the event that even a relatively small impact that could not be detected by a single acceleration sensor is applied toward a side of the fuel cell box, if the predetermined amount of deformation of the vehicle body is detected by the deformation detecting sensor, the fuel cell is allowed to start taking a protecting action by the protecting device. Thus, there is provided an advantage that the fuel cell can be protected against a collision in which a large impact cannot be detected.

According to the second aspect of the invention, an intrusion amount of the member of the vehicle body into the fuel cell box can be detected from the difference in travel of the vehicle body at the locations where the respective acceleration sensors are mounted by making effective use of the existing acceleration sensors. Thus, there can be provided an advantage that a countermeasures can be taken at low costa by making use of the existing acceleration sensors. In addition, there can be provided an advantage that when a relatively large impact is applied, the predetermined protecting action can also be taken by the acceleration sensors.

According to the third aspect of the invention, an intrusion amount of the member of the vehicle body into the fuel cell box can be detected directly. Thus, there can be provided an advantage that a highly accurate detection can be implemented.

What is claimed is:

1. A fuel cell vehicle driven by generated electric power of a fuel cell, the vehicle comprising:
   a fuel cell box disposed under a floor of the fuel cell vehicle for storing the fuel cell;
   a deformation detecting sensor for detecting an amount of a deformation of a vehicle body sideward of the fuel cell box; and
   a protection device for implementing a predetermined protecting operation of the fuel cell when the deformation detecting sensor detects a predetermined amount of deformation of the vehicle body.

2. A fuel cell vehicle as set forth in claim 1, wherein the deformation detecting sensor comprises a plurality of acceleration sensors, and wherein the vehicle body deformation amount is obtained based on a difference in travel of a vehicle body calculated from accelerations detected by the respective acceleration sensors.

3. A fuel cell vehicle as set forth in claim 1, wherein the deformation detecting sensor is a stroke sensor provided at a side of the fuel cell box.

4. A fuel cell vehicle as set forth in claim 2, wherein the deformation detecting sensor comprises two acceleration sensors, one sensor disposed substantially at the center of the vehicle, the other sensor disposed on a side of the vehicle.

* * * * *